F. R. FULLER.
COMBINATION CHECK REGISTER AND EXPENSE CONTROL BOOK.
APPLICATION FILED MAY 21, 1918.
1,325,243.
Patented Dec. 16, 1919.
3 SHEETS—SHEET 1.
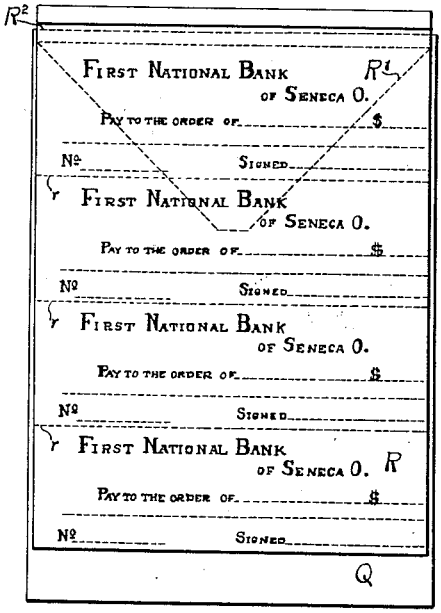
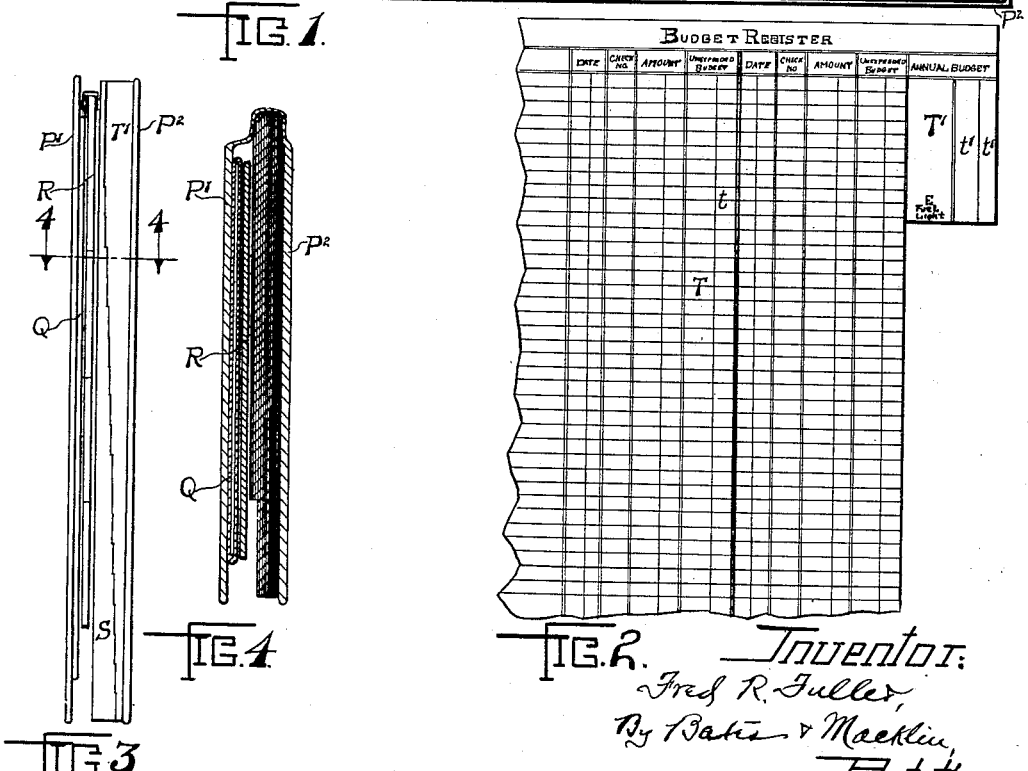

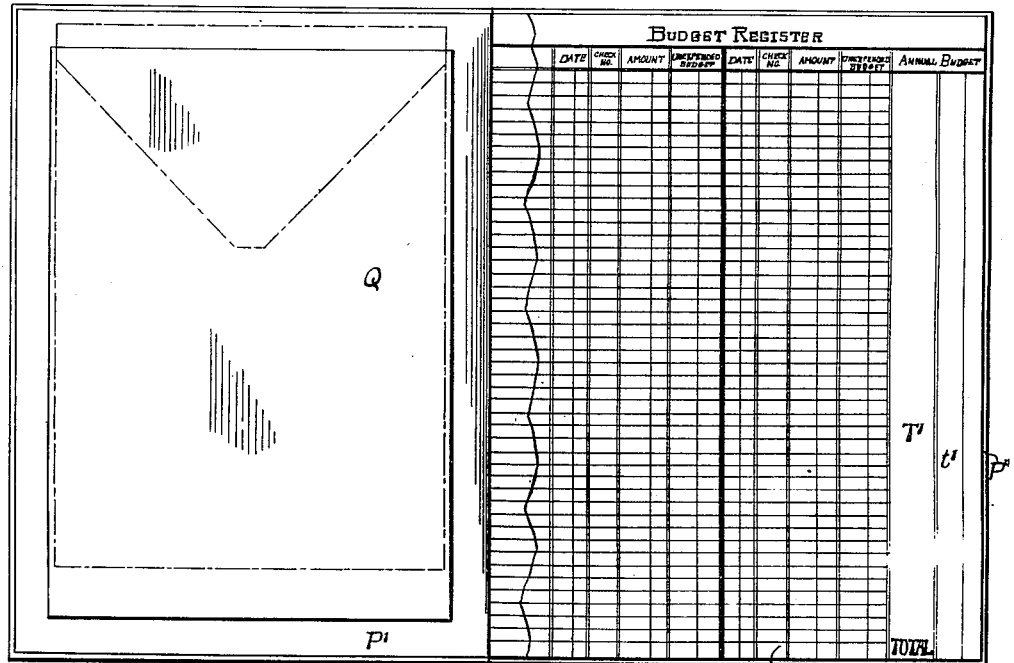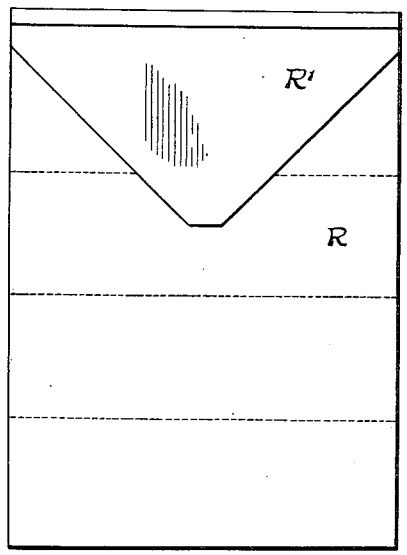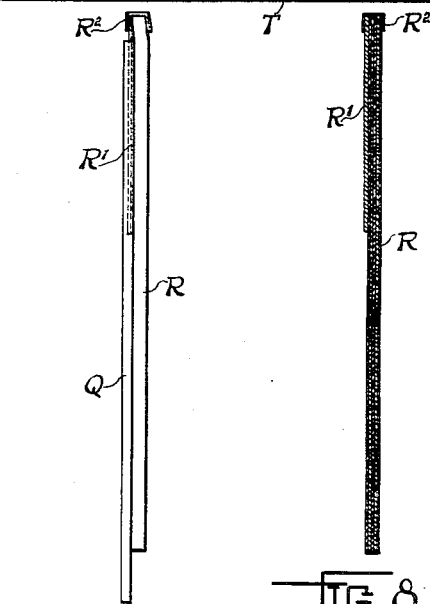

F. R. FULLER.
COMBINATION CHECK REGISTER AND EXPENSE CONTROL BOOK.
APPLICATION FILED MAY 21, 1918.

1,325,243.

Patented Dec. 16, 1919.

Inventor:
Fred R. Fuller,
By Bates & Macklin,
Attys.

UNITED STATES PATENT OFFICE.

FRED R. FULLER, OF BAY VILLAGE, OHIO.

COMBINATION CHECK-REGISTER AND EXPENSE-CONTROL BOOK.

1,325,243. Specification of Letters Patent. Patented Dec. 16, 1919.

Application filed May 21, 1918. Serial No. 235,774.

*To all whom it may concern:*

Be it known that I, FRED R. FULLER, a citizen of the United States, residing at Bay Village, in the county of Cuyahoga and State of Ohio, have invented a certain new and useful Improvement in Combination Check-Registers and Expense-Control Books, of which the following is a full, clear, and exact description, reference being had to the accompanying drawings.

This invention relates to a combined check record and account book so organized that the amounts paid by check may be readily distributed under the appropriate headings of a classified budget, and the unexpended balance of each budget item be shown continuously. My book enables the householder, for example, to know at all times whether the expenditures are keeping properly within the budget allowance, and furnishes an effective incentive for systematic saving. By means of my book the bookkeeping system is easily understood, involves little work and the entire record is contained within a single volume.

In carrying out the invention, I have provided under one cover three groups of related pages. The first group comprises a series of blank bank checks, preferably arranged in pad form and readily removable from the book so that a fresh supply may be furnished. The second group comprises a check and deposit register ruled and headed for the entry of the amounts of the checks, amounts of the deposits and the balances, and for the entry of an index key to the budget classification. The third group comprises a series of pages apportioned to the different budget items and each ruled and headed for the identification of the check, the amount of the check and the unexpended budget balance. The budget designation is preferably printed on a marginal extension of the budget page, these extensions being cut to different lengths to successively project below the preceding extensions, whereby the names, as well as key designations of the budget items, are arranged in column on the set of extensions. Associated with these names is a column for the entry of the estimated budget amount.

With a book formed as indicated the user first makes out his budget, and enters the estimate of each item on the marginal extension of the corresponding portion of the budget register, and then transfers the amount of this item to the top of the page carrying the extension in a column which may be designated "Unexpended budget." All deposits in the bank are entered on the deposit column of the check and deposit register, and whenever a check is made out it is entered on such register and its amount subtracted from the preceding balance, and the key designation (as for example an appropriate letter) of the corresponding budget classification is entered on the check and deposit register. Then the amount of the check is transferred to the budget register and deducted from the unexpended budget balance.

My book shows at a glance not only what checks have been used, but the bank balance and the amount which remains unexpended in each budget item. This latter feature enables the user to keep a ready track of the way the expenditures are running, and furnishes an incentive to curtail any excessive items with a view to accomplishing the desired saving.

The drawings clearly illustrate my register. Figure 1 is a face view of the book open, showing the bank checks on the inside of the left hand cover, the check and deposit register on the front portion of the right hand half, and the extension tabs of the budget register projecting at the extreme right from the budget register columns which are located behind the check and deposit register; Fig. 2 is a face view of one of the pages of the budget register; Fig. 3 is an edge elevation of the book closed; Fig. 4 is a cross section as indicated by the line 4—4 on Fig. 3; Fig. 5 is a face view of the book open with the checks removed (their position being indicated in broken lines) and with the ruled pages removed in front of the "total" page of the budget register; Fig. 6 is a rear elevation of the block of checks; Fig. 7 is an edge elevation thereof; Fig. 8 is a vertical cross section thereof; Fig. 9 is a view similar to Fig. 1 with an illustrative budget entered on the extensions, and with four illustrative checks filled out, and the corresponding entries made on the check and deposit register; Figs. 10 and 11 are portions of pages of the budget register having the key letters A and B, to which the corresponding items have been transferred from the check and deposit register shown in Fig. 9.

As shown in the drawings P' and P² indicate the right and left hand covers of the book. Q indicates a pocket secured to the inner face of the left-hand cover P', this pocket being open at the top. R indicates the block of checks fastened together at the top into a suitable pad which is provided with a rearwardly extending tongue R' adapted to occupy the pocket Q. Four checks are shown on each page of checks connected by perforated lines r and readily separable from each other and from the common top portion R² to which the tongue R' is connected.

The pages of the check and deposit record are designated S. They are bound permanently to the book at their left-hand margin and are all ruled as shown in Figs. 1 and 9, the ruling providing columns respectively for the number of the check, the date of the check, the payee of the check, the corresponding budget designation, the amount of the check, the amount of deposits and the balance. As shown in Figs. 1 and 9 I have designated these columns by the following headings: No., Date, Payee, Budget letter, Amount of checks, Deposit, Balance.

T in Figs. 2, 10 and 11 indicate pages of the budget register. As these pages need contain only the date, the number and amount of the check and the amount of the unexpended budget balance, I find it convenient to divide the page vertically into two sets of columns, this division being indicated by the heavy line t. As shown, each portion of these pages has four columns labeled respectively: Date, Check No., Amount, Unexpended budget.

One or more pages of the budget register are appropriated to each budget item. Each budget page (or the first page of each budget set, if more than one page applies to a budget item) is provided with a right hand extension, designated T'. The extensions of successive pages (or sets of pages) extend below the preceding extensions so as to have a visible portion, and on this visible portion is the budget designation. Adjacent to the budget designation is a column t' for the entry of the budget estimate. By reason of the underlapping character of the budget designations they are all visible simultaneously, as shown in Fig. 1, and the amounts in the column t' may be readily added and placed as a total item on the lowermost extension, as appears in Fig. 9.

Fig. 1 shows the budget register printed for household use, the first page or pages of this register, designated A, being for "rent," the second page or set of pages for "groceries," and the third page or set of pages for "meat," etc., the final page carrying the word "Total" at the bottom opposite the column which extends over all of the extension tabs. It is to be understood of course that this special wording may be varied according to the use the register is to be put, or the designations may be left blank to be inserted by the user. If printed, there are preferably several blank tabs, as indicated at t², Fig. 1, for inserting other designations.

The method of using my combined check book and expenditure controller is as follows: Suppose the householder estimates that his net income is $3500. per year. He enters this amount opposite the word "Total" in the annual budget column t' at the extreme right of the register. He subdivides the entire amount between the various budget headings, including a heading for "savings," as his experience indicates, and as is shown by way of example in Fig. 9. Then he enters the amount apportioned to the different budget items at the top of the unexpended budget column on the page of the budget item A, which in this instance is supposed to be for rent, as shown in Fig. 11. The "grocery" budget item of $600. is also shown as entered at the top of the unexpended budget item in Fig. 10, showing the B page.

Now, suppose the user makes out a check to Brown & Company for $35. for rent, to Doe & Bros. for $28.75 for groceries, to Henry Smith for dry-goods, and St. Paul's Church for $10. for charity, these being the checks illustrated in Fig. 9. Assuming that he has on deposit at the beginning of the year a balance of $193.30, when the first check is entered (Brown & Company, $35.) its amount is deducted from the balance $193.30 and the remaining balance of $158.30 is entered in the balance column. At the same time the key letter of the budget item is inserted in the column under "Budget letter," in this case the letter A. The second check to Doe & Bros. for groceries is similarly entered and deducted from the preceding balance and is given budget letter B, and so on.

After the items are entered on the check and deposit register the amount of each check is entered on the corresponding page in the budget register; that is to say, in this particular instance, the amount of the check to Brown & Company for $35. (budget letter A) is entered in the amount column of the A page of the budget register and subtracted from the budget estimate which was placed at the top of the column labeled "Unexpended budget," and the remainder is placed in this "Unexpended budget" column. This is illustrated in Fig. 10 showing that with an estimated budget of $420. for rent, $35. has been paid, leaving an unexpended budget of $385. Fig. 10 illustrates the item of $28.75 to Doe & Bros. for groceries, which was designated B in the proper column of the check and deposit register and is then entered in the amount column of the B page of the budget register and deducted from the budget balance, which in this case was the original budget item of $600.

It will be seen that my book takes the place of the ordinary check book and the ordinary household or expenditure account book, with a further feature that it sets forth continuously the unexpended balance of the budget estimate. This latter feature is believed to be very beneficial in providing a continuous informer of the rate of expenditure and a reminder of the necessity for curtailing expenditure in any particular item in order to produce the desired savings. The recommended manner of controlling expenditures with a given income is to estimate in advance the desired amount of saving and enter it in the budget column in making up the total income. This is naturally productive of systematic saving, the amounts being entered in this savings budget record whenever a check is given to transfer the funds from the general bank account to some more permanent form of investment.

Having thus described my invention, what I claim is:

1. A combination check register and expense control book having blank checks, columns which are headed to indicate the amounts of the checks, the deposits and the balance, and a budget register having columns headed for the amounts of the checks and for the unexpended budget balance, the budget register being provided with key designations and the check and deposit record having a column for the entry of such designations.

2. A combination check register and expense control book having blank checks, columns marked for the amounts of the checks, the deposits and the balance, and a budget register having columns marked for the amounts of the checks and for the unexpended budget balance, the budget register being provided with marginal extensions carrying suitable designations successively underlapping each other, whereby they may be simultaneously visible.

3. A combination check register and expense control book having blank checks, columns ruled and headed for the amounts of the checks, the deposits and the balance, and a budget register having columns ruled and headed for the amounts of the checks and for the unexpended budget balance, the budget register being provided with marginal extensions carrying suitable designations successively underlapping each other, and there being a column across the various extensions for the entry of the corresponding budget estimates.

4. In a book of the character described, the combination with means for carrying a block of blank checks in said book, of a check and deposit register having columns respectively designated for the number, date, payee and amount of the check, amount of the deposits and for the balance, and a column for a budget index, and a budget register having columns respectively designated for the check number, the check amount, and the amount of the unexpended budget balance.

5. In a book of the character described, the combination of a payment register and a budget register, the payment register having a column legended for the individual items of payment and a column legended for various budget indices, and the budget register having a column legended for the individual amounts and a column legended for the unexpended budget balance, the various pages of the budget register having lateral extensions successively projecting below other extensions, these extensions having budget designations on them.

6. In a book of the character described, the combination of a payment register and a budget register, the payment register having columns designated for the names of payees and the amounts of individual items of payment and a column designated for various budget indices, and the budget register having a column designated for the individual amounts and a column designated for the unexpended budget balance, the various pages of the budget register having lateral extensions successively projecting below other extensions, these extensions having budget designations on them, and the set of extensions having a column for the entry of budget estimates.

7. In a book of the character described, the combination of a check and deposit register having columns with a printed heading to indicate the amount of the check, the amount of the deposits and the balance, and a column with a printed heading to indicate budget indices, and a budget register having a column with a printed heading to indicate the check amount and a column with a printed heading to indicate the unexpended budget balance and carrying a corresponding budget index.

8. In a book of the character described, a check and deposit register having columns legended for the number, date, payee and amount of the check, amount of deposits and for the balance, and a column legended for a budget index, combined with a budget register having columns legended respectively for the check number, the amount and the unexpended budget balance.

9. In a book of the character described, a check and deposit register having columns legended for the number, date, payee and amount of the check, and columns legended for the deposits and for the balance, and a column for a budget index, combined with a budget register having a column legended for the check number, a column for the amount and a column legended for the unexpended budget balance, the budget register being located at the back of the check and deposit register and having marginal portions projecting beyond the check and deposit register, said marginal portions being cut off to different lengths whereby they successively underlap, and each marginal portion having a budget designation and a column, whereby the total budget may be displayed for simultaneous observation on said extensions.

10. In a book of the character described, the combination with a cover, of a pocket at the inside of one cover, a block of checks bound together and having a tongue occupying the pocket, a check register and a budget register bound into the volume, the check register comprising columns ruled and designated for the amount of the checks, the amount of the deposits and the balance and for a budget index, and the budget register being behind the check register and having columns ruled and designated for the check number, the amount thereof and the unexpended budget amount and having tabs extending beyond the margin of the check register, the tabs for various pages of the budget register projecting below each other and the visible portions of such projecting tabs carrying names indicating the budget item, and a column for the entry of the budget amount.

In testimony whereof, I hereunto affix my signature.

FRED R. FULLER.